Fig. 2

INVENTOR
HOMER W. YOUNG

Fig. 6

INVENTOR.
HOMER W. YOUNG

Fig.7

April 3, 1962  H. W. YOUNG  3,027,811
FIRE CONTROL MECHANISM FOR RECIPROCATING BOLT FIREARMS
Filed April 29, 1958  10 Sheets-Sheet 7

FIG. 9

INVENTOR.
HOMER W. YOUNG

April 3, 1962  H. W. YOUNG  3,027,811
FIRE CONTROL MECHANISM FOR RECIPROCATING BOLT FIREARMS
Filed April 29, 1958  10 Sheets-Sheet 9

FIG. 11

INVENTOR.
HOMER W. YOUNG
BY

April 3, 1962    H. W. YOUNG    3,027,811
FIRE CONTROL MECHANISM FOR RECIPROCATING BOLT FIREARMS
Filed April 29, 1958    10 Sheets-Sheet 10

INVENTOR.
HOMER W. YOUNG
BY John H. Lewis Jr.
Harry E. Braddock
James D. Crammond United States Patent Office 3,027,811
Patented Apr. 3, 1962

1

3,027,811
FIRE CONTROL MECHANISM FOR RECIPROCATING BOLT FIREARMS
Homer W. Young, Ilion, N.Y., assignor to Remington Arms Company, Inc., Bridgeport, Conn., a corporation of Delaware
Filed Apr. 29, 1958, Ser. No. 731,811
7 Claims. (Cl. 89—145)

This invention relates to fire control mechanism for a firearm of the type which is provided with a sliding breech block or breech bolt which is rearwardly movable to expose the chamber for loading the successive cartridges to be fired. The invention has particular application to an autoloading firearm of this type, although not necessarily limited to such use.

In the firearms art, extensive use has been made of fire control devices of the so-called "blocked sear" or "negative angle" type in which a component of the force urging the striker into engagement with the primer acts upon the sear in a way which tends to move the sear out of holding engagement with the striker. The present invention utilizes such a "blocked" or "negative angle" sear and supports that sear against movement out of sear engaging position by means of a shouldered block which is engageable by the trigger and may be moved thereby to disengage from the sear and permit the sear to release the striker. A distinctive feature of the present invention is the utilization of the sear blocking member as a disconnector which, in response to breech bolt movement away from the fully breech closed position, disconnects the sear block from the trigger and thereby prevents firing unless the breech bolt is fully closed. A further feature of this construction is that it functions as an anti-doubling device to provide for semi-automatic fire in the case of an autoloading firearm. The fire control devices shown in U.S. Patents No. 2,341,299 (42/69) to J. B. Sweany, and 2,514,981 (D-1062, 42/69) to M. H. Walker et al., are fairly representative of the blocked sear type of fire control which has been used in the past. Neither of these fire control devices, however, nor any other of which applicant is aware, provide disconnecting means which would make them adaptable to use with an autoloading type firearm, or to use with the type of firearm actuated by a manually slidable foreend.

A particular object of this invention is to make available for use with autoloading firearms or for use with manually operable firearms of the so-called pump-gun type a blocked sear fire control with its well-known advantages in regard to short, crisp trigger pull and fast lock time.

A further object is to produce a fire control mechanism of target quality but one which may be readily and economically assembled from parts which may be produced with great economy, thus providing a high quality fire control mechanism which may be utilized with low-priced mass produced firearms.

The exact nature of the invention, as well as other objects and advantages thereof, may be readily perceived by consideration of the following specification referring to the attached drawings in which.

2

Referring to the drawings by characters of reference, it will be seen that the firearm illustrated therein comprises a tubular receiver 10 housing a rearwardly slidable breech bolt 11 which, in this instance, is blow-back operated but which might, with equal facility, be manually operated. The breech bolt is formed at the rear end to provide a stepped counterbore 12 and 13 adapted to receive the striker 14, the striker spring 15, and a bolt return spring 16. A longitudinal slot 17 in the bottom face of the breech bolt breaks through into the cylindrical counterbores to receive and guide the forward portion of the striker which, in the operation of the firearm, impinges upon the cartridge primer. A receiver plug 18 is threadably engaged in the rear end of the receiver and is provided with a tubular projection 19 which encloses the firing pin spring 15 and forms an internal guide for the bolt return spring 16.

The fire control housing comprises a pair of identical side plates 20 which are spaced apart and secured together by hollow bushings 21, each of such bushings being formed with two necked-down end portions which extend through holes in the side plates far enough to be staked by conically spreading the ends to lock the side plates together on the bushings. In the final assembly of the rifle this side plate assembly is engaged in a slot in the bottom of the receiver 10 and there retained by cross pins 22 and 22–a passing through the receiver, the side plates, and certain parts contained therein.

The fire control mechanism mounted between the side plates 20 includes a sear 23, which is pivotally mounted on the rearmost of the retaining pins 22–a and is provided with a surface 23–a for engagement with a mating surface 24 on the striker 14. The surfaces 23–a and 24 are so disposed with relation to an imaginary line drawn between their point of contact and the center of the sear pivot 22–a that a substantial component of the force exerted on the striker by the spring 15 acts to swing the sear clockwise to a position out of holding engagement with the surface 24. A sear spring 25 is provided and tends to return the sear to striker retaining position, but its force is so limited that it will be readily overcome by the component of striker spring force. With the striker cocked, the sear is held in striker retaining position by means of a sear block 26 provided with a step 27 which engages beneath a corner 28 on the sear. The sear block is supported for both pivotal and longitudinal movement by means of a cross pin 29 passing through the side plates 20 and engaged within an elongated hole 30 in the sear block. A sear block spring 31 is provided which tends to urge the sear block to the rear and also tends to urge it to swing in a clockwise direction about the pin 29. The rear end of the sear block is provided with an abutment 32 designed to be engaged by a surface 33 formed at the upper extremity of the trigger 34. The trigger, it will be noted, is pivotally mounted at 35 on a cross pin passing through the side plates 20 and the extent of movement permitted to the trigger is limited by means of the pin 36 secured in the upper portion of the trigger and engaged in an enlarged hole 37 formed in the side plates 20. A trigger spring 38 is provided to engage the trigger and normally urges the upper end of the trigger to the rearmost position permitted by the enlarged holes 37. Formed integrally with the sear block is a disconnector 39 which extends upwardly into the receiver in the path of rearward reciprocation of the breech bolt. When the breech bolt is in its foremost position, completely closing the breech of the barrel, the disconnector permits the sear block to rise under the urging of the disconnector spring 31 to position the abutment 32 in opposition to the trigger surface 33. However, at any time when the bolt 11 is to the rear of its breech closed position, the bolt body overrides the disconnector 39 and forces the rear end of the sear block downward to such an extent that the abutment 32 is no longer opposed to the trigger surface 33. A manually operable safety 40 is provided and is pivotally mounted on the cross pin 41 passing through the side plates, a finger piece of the safety extending laterally through an appropriate slot cut in one of the side plates. The safety is provided with an abutment 42 which may be rotated into opposition to the trigger to oppose movement thereof to a striker releasing position. The safety is releasably retained in either of its two alternate positions by means of a detent roller 43 in engagement with a lobe 44 formed on the forward extension of the safety and urged resiliently by means of a safety detent spring 45. Conveniently, the detent 43 may comprise a necked-down cylindrical member with a portion of reduced diameter at each end of the cylindrical member slidably received in an appropriate portion 20–a of the slot 46 in each of the side plates 20 (see FIG. 5). All of the springs referred to above are simple, compression coil springs and all are retained between the housing walls by opposed identical guiding slots 46 formed in the side plates 20, such slots having a width less than the outside diameter of the springs and providing contacting surfaces disposed in a square about the spring. The terminal portion 47 of each of these slots engages a chordal portion at the end of each spring and provides a pair of diametrically opposed spring abutments against which the reaction of the spring may be taken.

*Summary of Operation*

Figure 1:
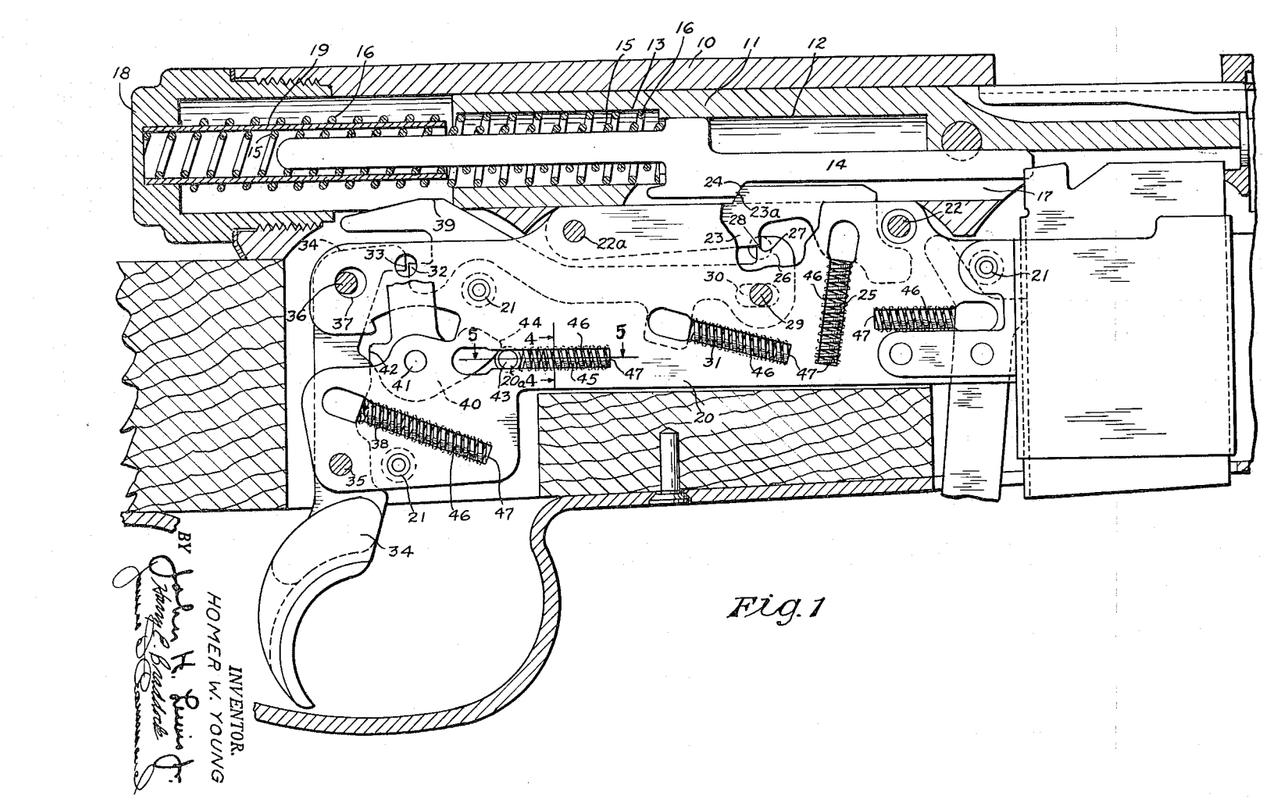
FIGURE 1 is a longitudinal vertical section through the major portion of the receiver of a firearm embodying this invention. The breech mechanism is fully closed, the striker is cocked, and the trigger is locked by the safety device.
Figure 2:
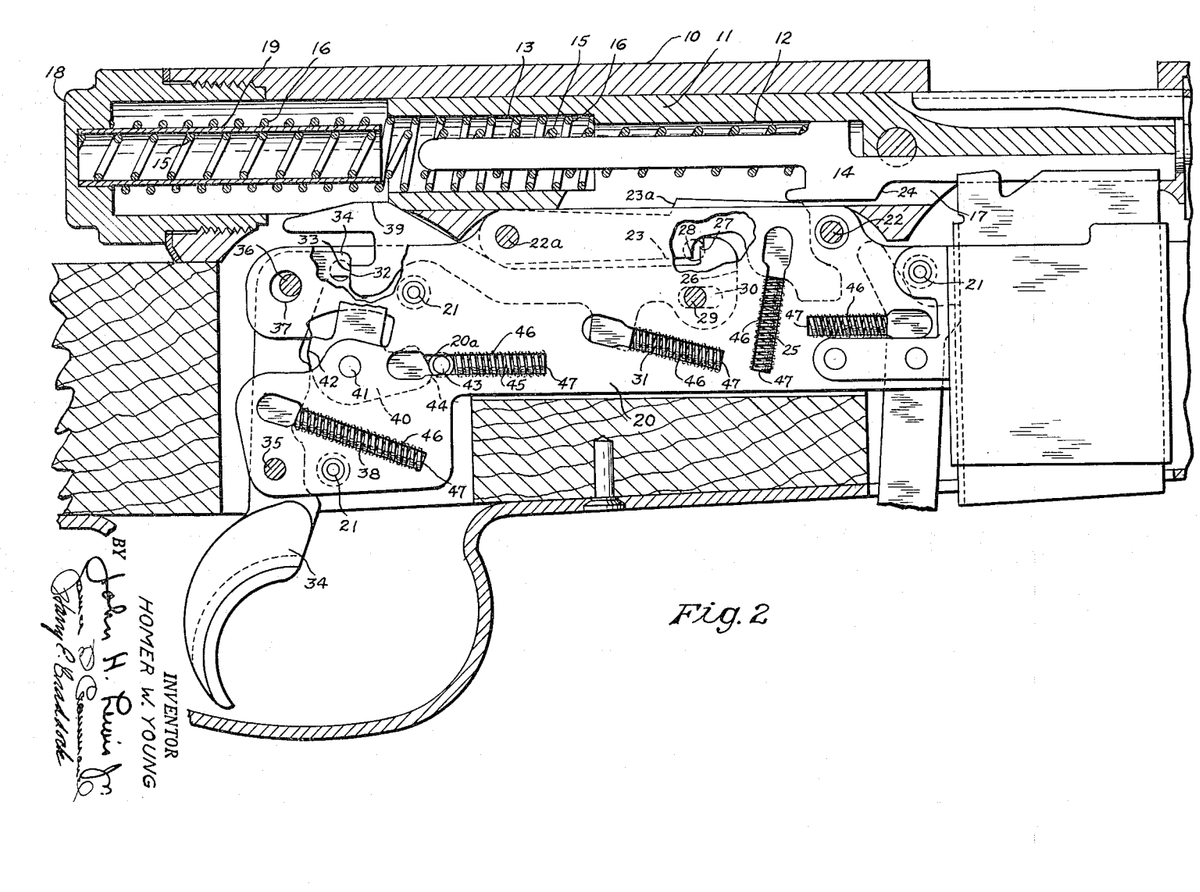
FIGURE 2 is a similar view, with the parts in a position occupied just after the striker has been released from engagement with the sear.

With the safety disengaged by clockwise rotation about the pivot 41 from the position shown in FIGURE 1 to the position shown in FIGURE 2, the trigger may be pulled, moving the surface 33 forwardly into engagement with the abutment 32 on the sear block and moving the sear block bodily forward to remove the step 27 from supporting engagement with the corner 28 of the sear. With the support thus removed from beneath the sear, the component of force exerted by the striker spring 15 readily overcomes the slight force exerted by the sear spring 25 and the sear swings clockwise about the pivot 22–a to release the striker 14 for engagement with a cartridge primer. As the striker moves forwardly, it overrides the top surface of the sear, which is provided with a surface of sufficient length that the striker will hold the sear down until such time as the striker is returned to cocked position. When the striker is so returned, upward displacement of the sear in response to the force of the sear spring 25 is limited by engagement of the forward extension of the sear with the foremost pin 22 securing the fire control assembly into the receiver.

Figures 3, 4, 5:
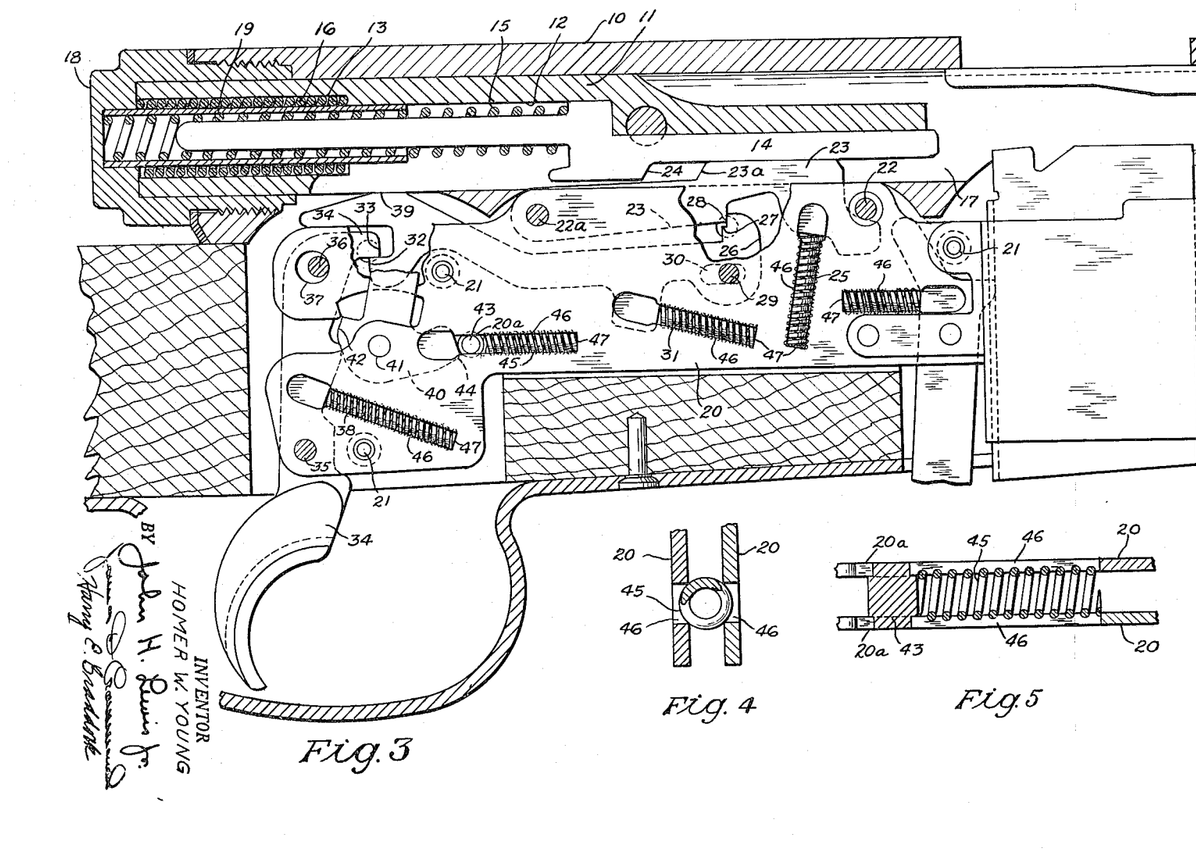
FIGURE 3 is a similar view, with the breech bolt in the fully opened position.
FIGURE 4 is a partial vertical cross sectional view on the line 4—4 of FIGURE 1.
FIGURE 5 is a partial horizontal cross sectional view on the line 5—5 of FIGURE 1.

After the arm has been fired, the rearward reciprocation of the breech bolt, performed either manually or automatically, will depress the disconnector 39, moving the abutment 32 out of engagement with the trigger surface 33 and freeing the disconnector at this point to move rearwardly under the influence of the spring 31 as soon as the sear is free to rise in front of a cocked striker. This action will take place even though the trigger may have been held in its completely pulled position without relaxation of the trigger finger. Assuming that the trigger is so held, the sear block and disconnector will move rearwardly and pick up the sear as soon as the striker has been moved to a cocked position, but in this situation the abutment 32 will be received beneath the portion 33 of the trigger and it will not be possible for the trigger to further effect the sear block until the trigger finger has been relaxed, permitting the surface 33 to be returned to the rear of the abutment 32. At this time, assuming that the breech bolt is by then in its foremost position, the disconnector will rise into the receiver and the abutment 32 will again be positioned in front of the surface 33. In this way we have provided for a positive interruption of the firing of an autoloading rifle, so that it functions semi-automatically or fires only one shot in response to each pulling of the trigger. Similarly, for manually operated slide action arms, we have disconnected the fire control mechanism in such a way that the trigger cannot be held down and the arm fired as a function of the locking movement of the breech mechanism. Thirdly, the disconnector serves to positively uncouple the firing mechanism until such time as the breech bolt has reached its safe and fully closed position, positively preventing firing from an unlocked or only partially closed breech bolt. FIGURE 3, which shows the components of our rifle with the breech bolt at the rearward extremity of its movement and with the trigger still pulled, best illustrates these functions of the fire control mechanism in providing for complete safety of the mechanism.

Figure 6:
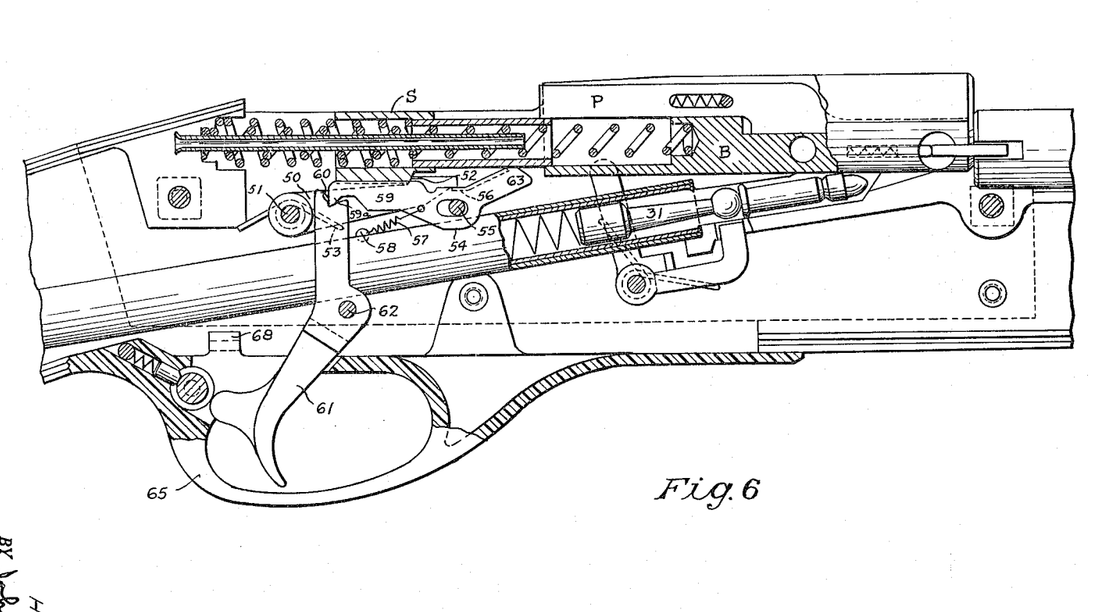
FIGURE 6 is a longitudinal section through the major portion of the receiver of a different type firearm embodying a modified version of the present invention. The breech mechanism is fully closed, the striker is cocked, and the trigger is locked by the safety device.
Figure 7:
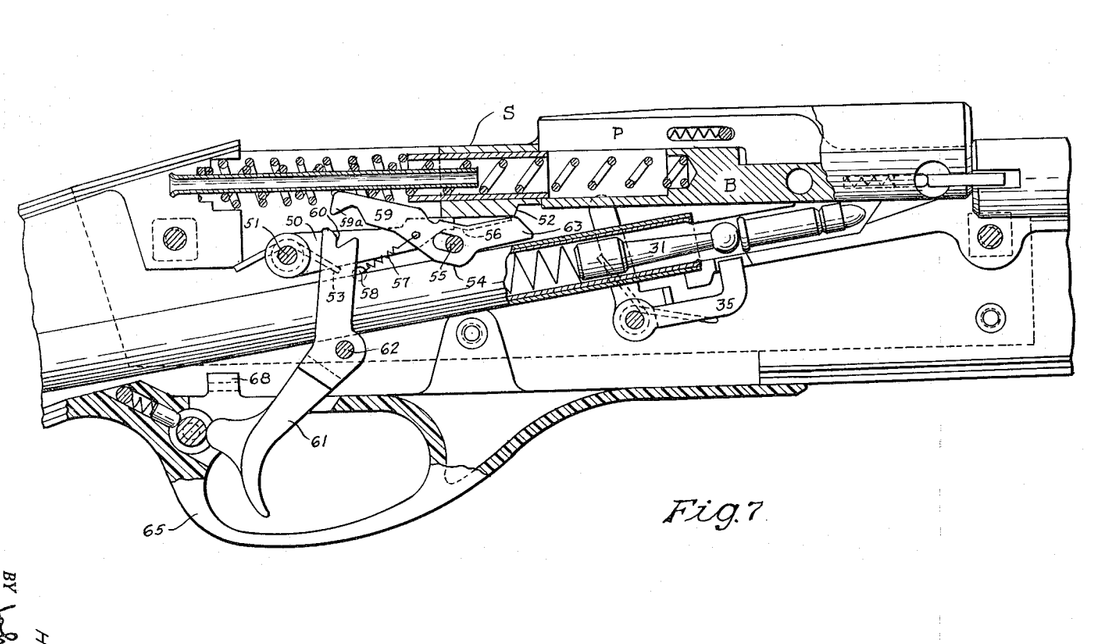
FIGURE 7 is a similar view to FIGURE 6 with parts in position occupied just after the striker has been released by the sear.
Figure 8:
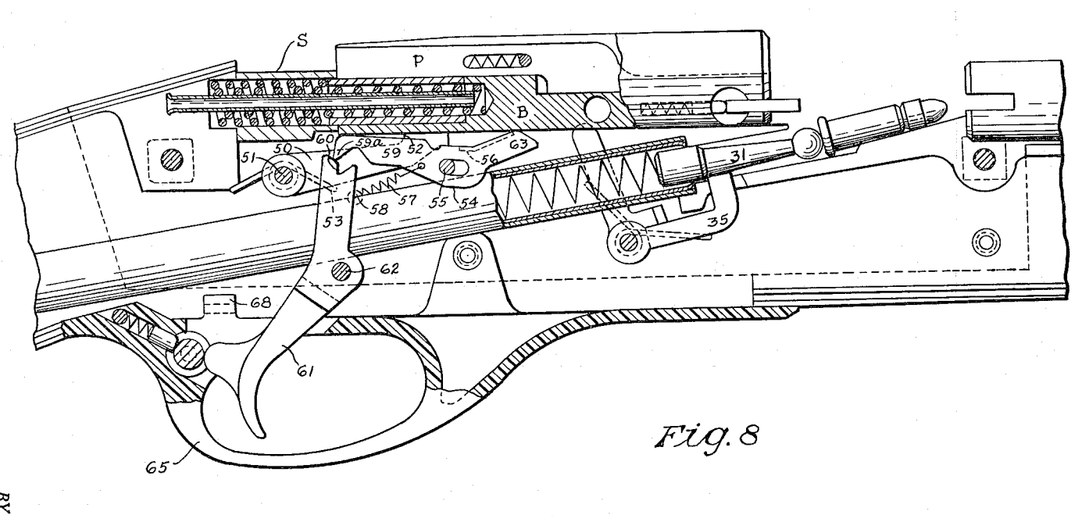
FIGURE 8 is a similar view to FIGURES 6 and 7 with breech bolt in fully opened position.

The modified fire control mechanism which is shown in FIGURES 6, 7 and 8, operates in essentially the same manner as that previously discussed herein but is intended for use in another type of firearm—for example, that disclosed in the co-pending application of Wayne E. Leek and Charles H. Morse, Serial Number 557,473, filed January 5, 1956, now abandoned and entitled "Breech Loading Firearm." The modified fire control mechanism comprises a sear 50 pivotally mounted on a crosspin 51 and engageable at 52 with a firing pin striker S on such an angle that a component of striker spring force acts to urge the sear to swing clockwise about the pivot 51 against the relatively light force applied by the sear spring 53. Such movement of the sear is blocked by a sear block 54 which is supported for both swinging and sliding movement relative to the axis of a crosspin 55. The sear block is provided with a laterally extending web 56 which may be engaged beneath the front corner of the sear 50. Sear block spring 57 is engaged between the sear block 54 and an appropriate crosspin 58. This spring acts both to move the sear block rearwardly on the pivot 55 and at the same time urge it to swing counterclockwise about that pivot. The rearwardly extending arm 59 of the sear block is formed to define an angular nose 59–a shaped for engagement with angularly related surfaces 60 formed on the upwardly extending arm of the trigger 61, the trigger being supported for pivotal movement about the pin 62. When the trigger is pulled in the normal manner, the upwardly extending arm is urged forwardly and, by its inter-engagement with the rearwardly extending arm 59 on the sear block, urges the sear block to move forwardly and out from beneath the sear 50, releasing the sear to be swung down by the component of striker spring force and permitting the firing pin striker S to impact upon the rear end of a firing pin P.

Since the firearm to which this modification of my invention is shown applied is a blowback operated autoloading firearm, the firing of the chambered cartridge will cause the breech bolt to be driven rearwardly and, as it does so, it will over-ride the forwardly extending disconnector arms 63 formed integrally with the sear block, thus rotating the sear block in a clockwise direction about the pivot pin 55 and disengaging the arms 59 of the sear block from the surfaces 60 in the upper end of the trigger. Assuming that the trigger finger has not been relaxed, this disconnection from the trigger will permit the springs 57 to move the sear block rearwardly into position beneath the sear so that the sear will intercept the firing pin striker when the breech bolt is again closed. The trigger, however, will not be able to act upon the sear block until such time as the trigger finger has been completely relaxed and the trigger permitted to return to its normal position, in which position the surfaces 60 may again engage the rearwardly extending arms 59 on the sear block.

It will be noted that in this modification it is not necessary to provide any separate trigger spring, for the interengagement of the nose 59–a on the rearwardly extending arm 59 on the sear block with the angularly disposed surfaces in the top of the trigger tends always to cam the trigger back to a normal centered position.

Figure 10:
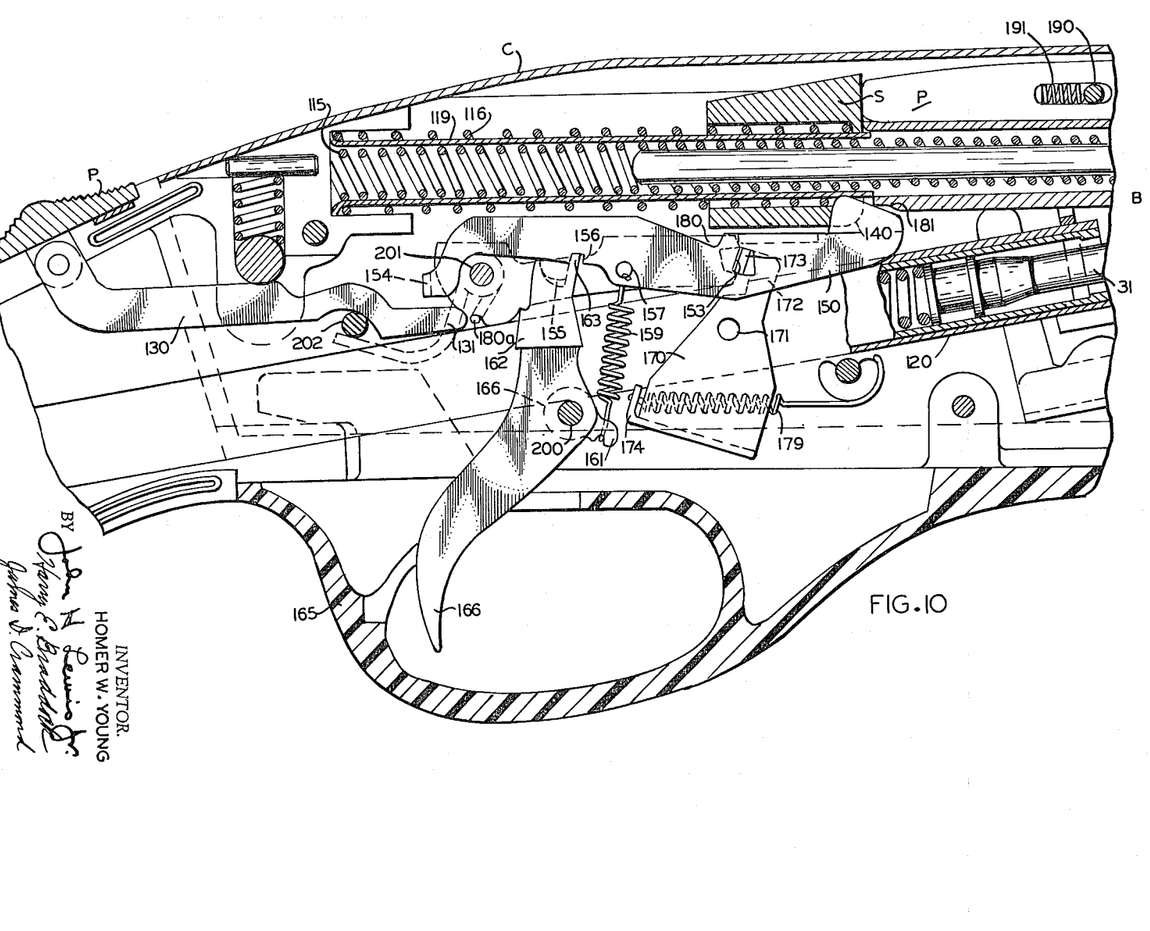
FIGURE 10 is a similar view to FIGURE 9 with parts in position occupied just after the striker has been released by the sear.
Figure 11:
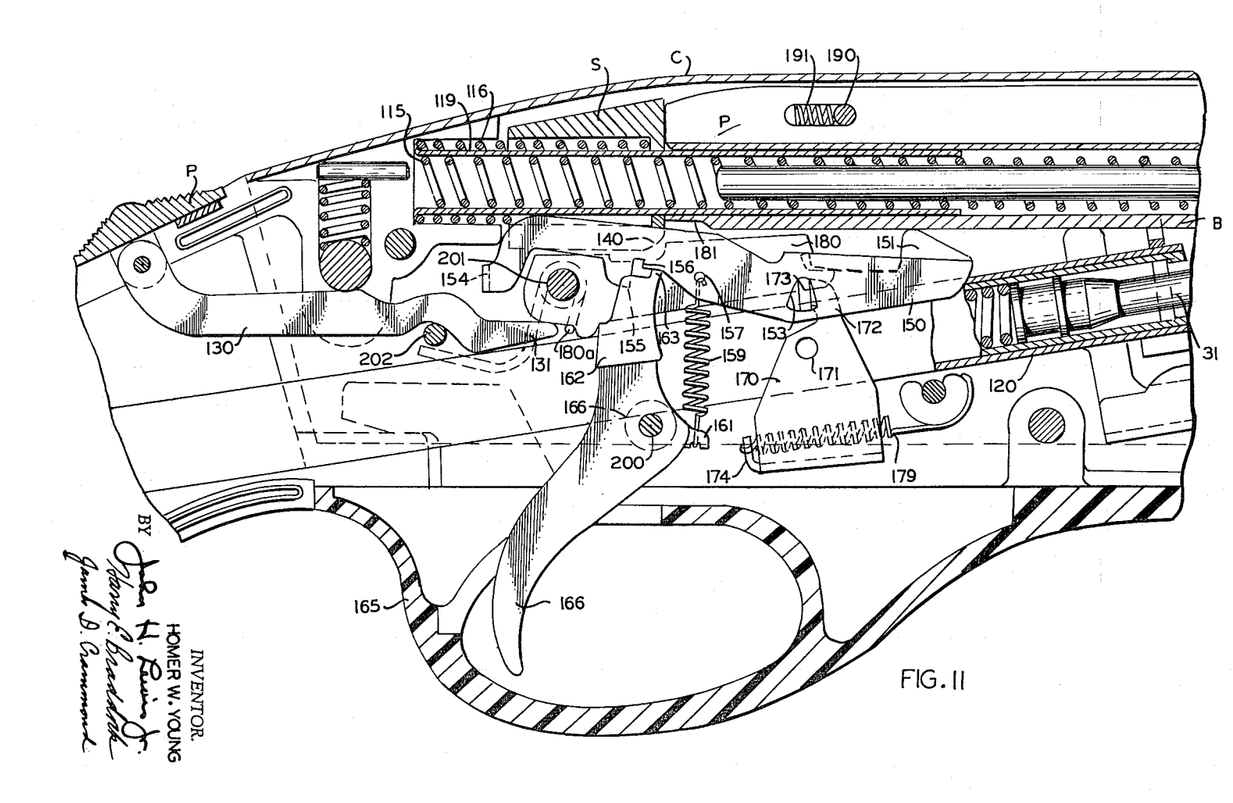
FIGURE 11 is a similar view to FIGURES 9 and 10 with breech bolt in fully opened position.
Figures 12, 13:
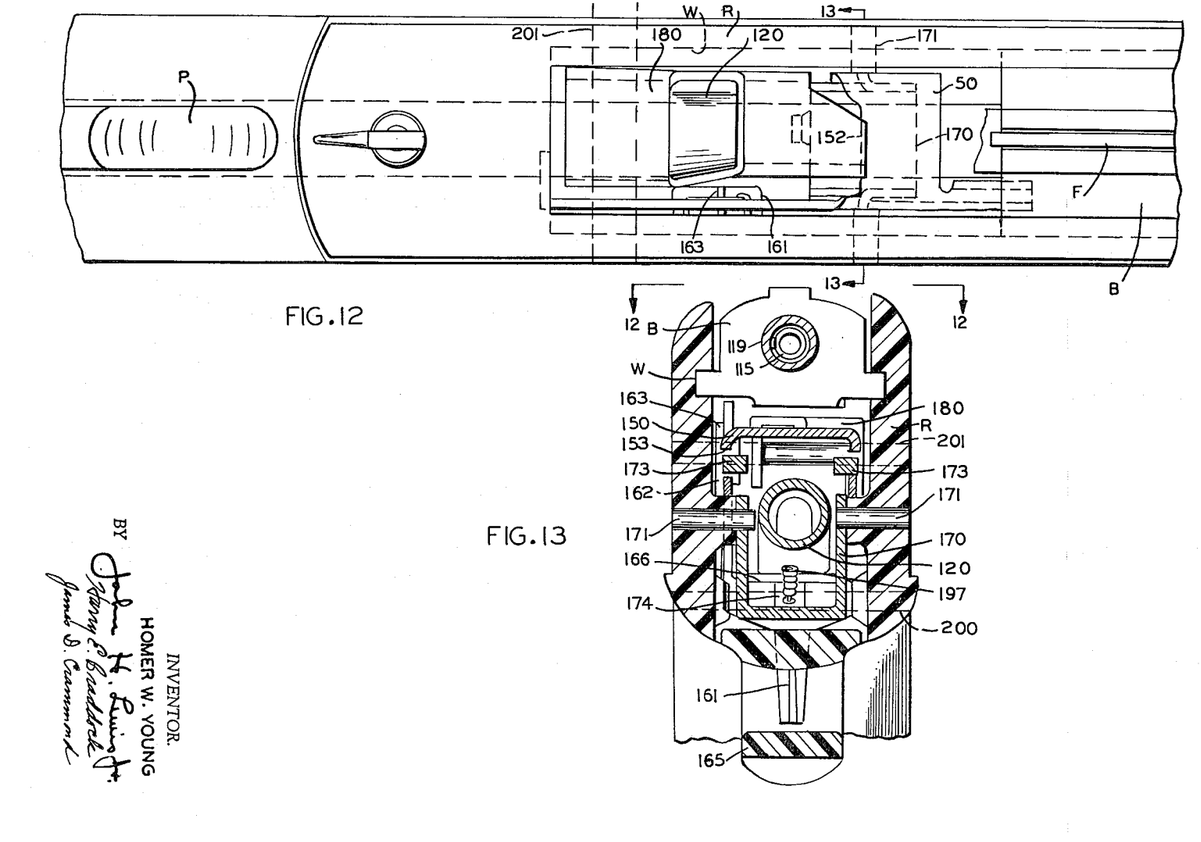
FIGURE 12 is a top plan view of the major portion of the receiver of the firearm shown in FIGURE 9; the striker and a portion of spring guide tube being broken away.
FIGURE 13 is a transverse vertical section taken at line 13—13 of FIGURE 12.

The second modification of the fire control mechanism which is shown in FIGURES 9, 10, 11, 12 and 13 operates in essentially the same manner as that previously discussed herein and is intended for use in a blow back operated autoloading firearm such as that disclosed in the co-pending application of Wayne E. Leek and Charles H. Morse, Serial No. 557,473, filed January 5, 1956, now abandoned, for "Breech Loading Firearm." This modification provides an added inertial counterbalance feature for preventing "jar-offs" or unintentional firing due to recoil forces or impacts of the firearm against other objects. This modification of the fire control mechanism comprises a sear 180 pivotally mounted on cross pin 201 and engageable at 181 with a firing pin striker S on such an angle that a component of striker spring force acts to urge the sear to swing clockwise about the pivot 201 against the relatively light force applied by the sear spring 180a. Such movement of the sear is blocked by a sear block element 150 having a blocking surface 152. Sear blocking element 150 is supported for both swinging and sliding movement relative to sear 180. The sear block 150 is provided with a laterally extending web, best shown in FIGURE 13 the rear edge 152 of which may be engaged beneath the front edge 182 of sear 180. The central portion of sear block 150 is provided with an inverted U-shaped transverse cross section (FIGURE 13). An aperture 153 is provided in each downwardly extending side portion thereof for engagement with laterally projecting lugs 173 on rocker element 170 which is pivotally mounted on pivot pins 171. As can be seen in FIGURE 13 rocker element 170 has a U-shaped transverse cross-section and is urged in a counterclockwise direction, as viewed in FIGURES 9, 10, and 11 by spring 179. It will be seen from the drawings that sear block element is movably supported in the receiver by rocker element 170 at its forward end and by either trigger abutment 163 or safety device lever 130 at its rear portion. Spring 159 acting between the trigger element 161 and the sear block 150 functions as a trigger return spring and to urge sear block 150 downwardly into engagement with the upper portion of the trigger for actuation thereby. Sear block 150 is provided on its under side with a trigger abutment engaging notch 156 which cooperates with trigger abutment 163. The trigger is supported for pivotal movement about pin 200.

Figure 9:
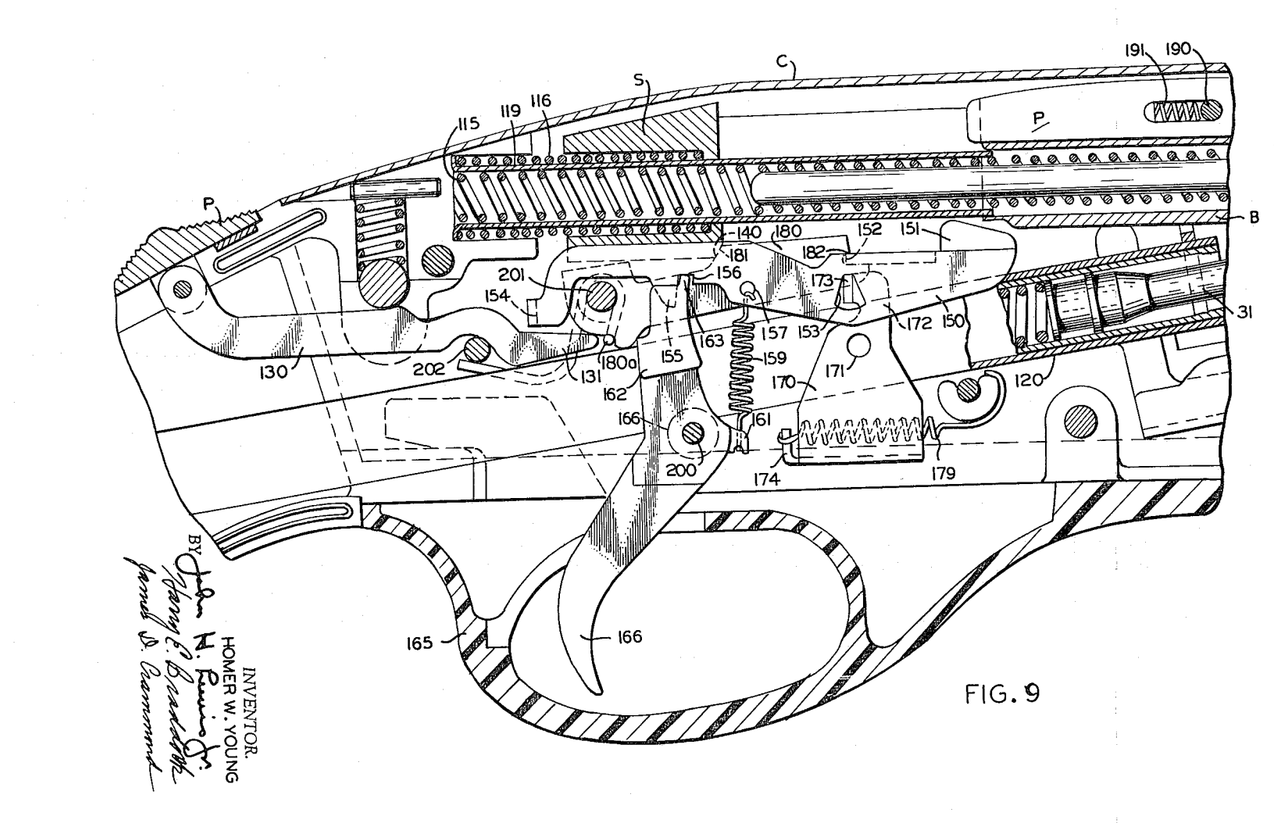
FIGURE 9 is a longitudinal vertical section through the major portion of the receiver of another type firearm embodying yet another modified version of the present invention. The breech mechanism is fully closed, the striker is cocked, and the safety device is in its inoperative position. Certain parts are broken away.

When the trigger is pulled in a normal manner the upwardly extending arm thereof is urged forwardly and by the interengagement of its abutment 163 with the notch 156 on the sear block 150, urges the sear block to move forwardly out from beneath sear 180, releasing the sear to be swung down by the component of striker spring force and permitting the firing pin striker S to impact upon the rear end of a firing pin P.

Since this type firearm is of the blow-back operated autoloading type, the firing of the chambered cartridge will cause the breech bolt to be driven rearwardly and as it does so, it will over-ride the forwardly extending disconnector portion 151 of the sear block 150, rotating the sear block in a clockwise direction about the pivot formed by the interengagement of rocker element projections 173 and the openings 153 in the sear block and disengaging the notch 156 from the trigger abutment 163. Assuming that the trigger finger has not been relaxed, this disconnection from the trigger will permit spring 179 acting through rocker element 170 to move the sear block rearwardly until the rear edge 152 of the sear block web portion engages the front end of sear 180. When the striker moves to its rearmost position the sear 180 will move upwardly under the action of its spring 180a and sear block will move rearwardly under sear lip 182 so that the sear will intercept and hold the striker in cocked position when the breech bolt is again closed. The trigger, however, will not be able to act upon the sear block until such time as the trigger finger has been relaxed and the trigger permitted to return to its normal position in which position the notch 156 on the lower side of sear block 150. It will be noted that in this modification because of the lower portion of rocker element 170 acting as somewhat like a pendulum will counteract the tendency of sudden shocks or accelerations of the firearm from actuating the sear block linkage due to its inertia effects and causing unintended discharge of the firearm.

I have illustrated and described specifically herein preferred embodiments of my invention and do not consider that my invention is limited to the details of the disclosure. For an exact definition of the limits upon the scope of my invention, reference may be made to the claims appended hereto.

I claim:

1. A blocked sear fire control device for a firearm having a reciprocating bolt and a spring-urged striker, said fire control device comprising means defining a sear engaging face on said striker; a movably mounted sear having formed thereon a face engageable with the said sear engaging face on said striker in such relationship that when the sear is in striker retaining engagement with the striker a component of the spring force acting on said striker will tend to disengage the sear from said striker; a sear block engageable with said sear and movable from one position in which it supports said sear in said striker retaining engagement against the urging of said disengaging component of spring force to another position in which it fails to provide such support; trigger means engageable with said sear block and manually operable to move said sear block out of sear supporting position; disconector means engaged by said bolt and acting on said sear block to move said sear block out of engagement with the trigger when the bolt is reciprocated; and means acting on said sear block tending to restore the sear block to sear-supporting position.

2. A blocked sear fire control device for a firearm having a receiver, a reciprocating bolt, and a spring-urged striker, said fire control device comprising means defining a sear engaging face on said striker; a sear swingably mounted in said receiver having formed thereon a face engageable in striker retaining relationship with the said sear engaging face on said striker, said faces being disposed in such relationship to each other and to the swingable mounting of the sear that a component of the spring force acting on said striker acts to urge said faces out of engagement with each other; a swingably and slidably mounted sear block in said receiver engageable with said sear and slidable from one position in which it supports said sear against movement away from striker retaining engagement under the urging of said component of spring forced to another position permitting movement of said sear block out of striker retaining engagement; trigger means engageable with said sear block and manually operable to slide said sear block out of sear supporting position; disconnector means engaged by said bolt and acting on said sear block operable when said bolt is reciprocated to swing said sear block out of operative engagement with the trigger; and spring means acting on said sear block tending to slide sear block back to its sear supporting position either when said sear block is engaged with the trigger or out of operative engagement therewith.

3. A fire control device as described in claim 2, said last mentioned spring means being so mounted and so engaged with the sear block as to tend to impart both rotary and sliding movement to said sear block so as to rotate said sear block back into operative engagement with the trigger when permitted to do so by the disconnector means.

4. A fire control device as described in claim 3, abutments on said trigger and on said sear block being so shaped that when the sear block has been swung out of operative engagement with the trigger the abutments will prevent return of the sear block to operative engagement with the trigger until manual pressure on said trigger has been removed.

5. A fire control device as described in claim 4, said sear being provided with spring means tending at all times to return said sear to position for engagement of said faces.

6. A fire control device as described in claim 5, said sear being provided with a surface substantially paralleling the line of movement of said striker, which surface is overridden by the striker when said faces are permitted to disengage, said overriding of the sear holding the sear down against the urging of the sear spring until said striker has been again completely cocked.

7. A blocked sear fire control device for a firearm having a receiver, a reciprocating bolt, and a spring-urged striker housed therein, said fire control device comprising an abutment on said striker having a sear engaging face; a sear pivotally mounted in said receiver and formed with a face engageable with said striker abutment face, said engaging faces being so disposed relative to a line projected between their point of contact and the point of pivtal mounting of said sear that the angular relationship is greater than the angle of repose and a component of the force of the striker spring acts to disengage the sear from said striker abutment surface; a swingably and slidably mounted sear block in said receiver engageable with said sear and slidable from one position in which it supports said sear against the urging of said component of spring force to another position permitting said faces to disengage; trigger means engageable with said sear block and manually operable to slide said sear block out of sear supporting position; disconnector means engaged by said bolt and acting on said sear block operable when said bolt is reciprocated to swing said sear block out of operative engagement with the trigger; and spring means acting on said sear block tending to slide said sear block back to its sear supporting position.

References Cited in the file of this patent

UNITED STATES PATENTS

| | | |
|---|---|---|
| 975,286 | Ross | Nov. 8, 1910 |
| 2,249,231 | Smith | July 15, 1941 |
| 2,342,283 | Hyde | Feb. 22, 1944 |
| 2,659,994 | Yale | Nov. 24, 1953 |
| 2,813,362 | Sunderland | Nov. 19, 1957 |

FOREIGN PATENTS

| | | |
|---|---|---|
| 339,605 | Germany | July 30, 1921 |